3,733,392
OXYCHLORINE TRIFLUORIDE AND ALKALI FLUORIDE-Cl₂O COMPLEX

Donald Pilipovich and Richard D. Wilson, Canoga Park, and H. Fred Bauer, Thousand Oaks, Calif., assignors to North American Rockwell Corporation
No Drawing. Filed Apr. 13, 1966, Ser. No. 543,493
Int. Cl. C01b 11/02; C01d 3/02
U.S. Cl. 423—179 R      4 Claims

ABSTRACT OF THE DISCLOSURE

The new compounds, $OClF_3$ and $MF \cdot Cl_2O$ where M is an alkali metal, are prepared by reacting $Cl_2O$ with an alkali metalfluoride to form $MF \cdot Cl_2O$ and then fluorinating to form $OClF_3$, which is useful as an oxidizer in rocket engines.

---

This invention relates to new chemical compounds and their method of manufacture.

The herein invention relates to a new chemical compound, oxychlorine trifluoride, $OClF_3$, and its method of manufacture. Additionally, in one of the methods of manufacture an intermediate compound $MF \cdot Cl_2O$ is formed, where M is an alkali metal.

The compound of the invention is attractive as an oxidizer, particularly for use in rocket engines or motors for various reasons. Firstly, the compound has bond energies which are low. This means that the atoms are loosely bonded and will break down to more stable, strong bonds and in so breaking down in a rocket motor, energy is released. The release of the energy in the form of heat helps the material leave the engine at a faster rate. Thus, two end results occur. One is that the material breaks to lower molecular weight products which would have a higher exit velocity. Secondly, the energy from the release of energy when the compound breaks down to form more stable compounds causes the material to exit at a higher velocity. Additionally, since the chlorine is contained in a high valence state, the material possesses obviously good oxidizing power. The third advantage of this compound is that it is more storable than the most important interhalogen oxidizer today, $ClF_5$.

Prior to the herein invention, the alleged compound $OIF_3$ was reported. Though this compound appears to be an analog of the compound of the invention, several differences exist. First, and probably most important, it is well known in the art of halogen and interalogen chemistry that one cannot replace a halogen or substitute one halogen for another and expect the same results. One reason for this is because of the varying valences of the halogen. Additionally, the compound $OIF_3$ is a solid which would not be suitable for all liquid oxidizer conditions. Furthermore, studies of the reported compound, $OIF_3$, have indicated that what really exists is an ionic compound having the structure $IO_2^+IF_6^-$ as suggested by the original investigators. Clearly such an ionic compound is not sought or desired with regard to the instant compound of this invention. One further particular difference between the reported similar compound and the one of this invention is that the reported method of making the previous compound which was the reaction of $IF_5$ with $I_2O_5$: $I_2O_5 + 3IF_5 \rightarrow 3IOF_3$ (according to an article by E. E. Aynsley et al., J. Chem. Soc., 623 (1953) cannot be used as a method for preparing the compound of this invention.

There are two novel methods of making the compound of the invention. The first method is by low temperature fluorination of $Cl_2O$ according to the following reaction:

(I)     $Cl_2O + 3F_2 \rightarrow ClF_3 + OClF_3$

The second method relates to complexing $Cl_2O$ with an alkali metal fluoride in accord with reactions II and III to give the compound of the invention.

(II)     $Cl_2O + MF \rightarrow MF \cdot Cl_2O$ (III)    $MF \cdot Cl_2O + 3F_2 \rightarrow MClF_4 + OClF_3$ where M is an alkali metal.

The reactions either in the presence or absence of the alkali metal fluoride result in the product of the invention, $OClF_3$, which can be distilled by stripping off the volatiles. In the laboratory scale it is convenient to trap the product at low temperatures in a vacuum line.

As can be seen from reaction II, the novel complex $MF \cdot Cl_2O$ is formed. This complex is then used in reaction III as a starting material which is fluorinated to ultimately give $OClF_3$. However, the complex $MF \cdot Cl_2O$ can be used as a means for generating $Cl_2O$ as a bleaching agent for commercial purification. $Cl_2O$ is generated from the complex upon heating thereof. In other words, the complex provides a means for effectively storing $Cl_2O$. Thus, the complex finds utility separate from that of being a mere intermediate in the formation of $OClF_3$.

Generally, reaction I and reaction III are carried out in an excess of a stoichiometric amount of fluorine. The temperatures at which the reaction I and III are carried out can vary from $-125°$ C. to ambient. The pressure of the reaction is not critical. It can vary from one atmosphere to several thousand atmospheres. Often on laboratory scale equipment, the pressure in the closed vessels utilized was from 400–500 p.s.i. The reaction time is relatively slow with it normally beginning after one hour. The completion of a reaction with a given temperature and pressure can only be determined by recovery of the end products to find when conversion had been completed. With regard to reaction II for forming the new complex, the two starting materials are brought together generally in a closed vessel and the reaction is carried out under the pressure generated by the reaction itself. The reaction is completed when no observable dissociation pressure is observed. Generally, the reaction is carried out at any temperature within the liquid range of $Cl_2O$. This is within the range of $-116$ to $+2°$ C. The existence of compound $OClF_3$ was confirmed by both an elemental analysis and an IR spectrum, which had bands at 1220 cm.$^{-1}$, 680 cm.$^{-1}$, 490 cm.$^{-1}$, 320 cm.$^{-1}$, and 286 cm.$^{-1}$. The compound has the properties as set forth in Table I:

TABLE I

| | |
|---|---|
| Melting point, ° C. | $-66 \pm 1$ |
| Boiling point, ° C. | $29.4 \pm 1.0$ |
| Molecular weight: | |
|     Found (from vapor density measurement) | 105 |
|     Calculated | 108.5 |
| Molar heat of vaporization, kcal. | 7.7 |
| Trouton constant | 25.4 |
| Density, g./cc. at 25.5° C. | $1.90 \pm 0.05$ |

Generally the reactions can be carried out in a vessel of an inert material such as stainless steel which should be previously passivated by exposure to at least one atmosphere of fluoride for a period of at least sixteen hours. Chlorine monoxide, $Cl_2O$, and fluorine are introduced into the reactor by distillation in vacuo. The separation of the product $OClF_3$ from other side products is achieved by fractional condensation in vacuo. Excess fluorine and oxygen pass through a trap held at $-196°$ C. The next most volatile side products including $FClO_2$, $ClF$ and $Cl_2$ are removed by passage through a cold trap held at $-95°$ C. At this point $ClF_3O$ is retained. Chlorine trifluoride, $ClF_3$, is also partially retained at $-95°$ C.

Separation of the part of the invention from the $ClF_3$ is best achieved by repeated passage through a trap held at $-78°$ C. This trap retains a majority of the $ClF_3O$ but passes $ClF_3$ as well as a part of the $ClF_3O$. It is believed the invention will be better understood from the following detailed examples:

EXAMPLE I

To 55 grams (0.36 mmole) of powdered cesium fluoride (previously dried by fusion and then transferred to a dry box for subsequent grinding and transfer) was added 0.168 mole of $Cl_2O$. This was allowed to stand at $-78°$ C. for 20 hours prior to addition of 0.4 mole fluorine. After a reaction period of 100 days at $-78°$ C., $ClF_3O$ was collected both from the volatile products and, in much smaller quantities, from pyrolysis of the nonvolatile salt. A total of 0.115 mole of $ClF_3O$ was collected for a 68 percent yield based on $Cl_2O$ consumed.

EXAMPLE II

To fifty grams (0.48 mole) of rubidium fluoride powder (stored and transferred in a dry box) was added 0.627 mole of $Cl_2O$. This was allowed to stand at $-78°$ C. for three days prior to fluorine addition. A total of 1.5 moles of fluorine was added in four fractions over a reaction period of fifty days at $-78°$ C. The volatile products contained 0.157 mole of $ClF_3O$. Pyrolysis of the nonvolatile solid yielded additional but unmeasured amounts of $ClF_3O$. Thus, the overall yield was in excess of 25 percent based upon $Cl_2O$ consumed.

EXAMPLE III

To 10 grams (0.17 mole) of powdered potassium fluoride (previously dried by fusion and then transferred to a dry box for subsequent grinding and transfer) was added 0.125 mole of $Cl_2O$. This was allowed to stand at $-78°$ C. for 2½ days prior to addition of 0.4 mole fluorine. After a reaction period of 55 days at $-78°$ C., separation of the voltatile products yielded 0.054 mole of $ClF_3O$ for a yield of 43 percent based on $Cl_2O$ consumed. Pyrolysis of the nonvolatile solid yielded $ClF_3$ but no additional $ClF_3O$.

EXAMPLE IV

To 40 grams (0.95 mole) of sodium fluoride powder (dried at 120° C. prior to storage and transfer in a dry box) was added 0.343 mole of $Cl_2O$. This was allowed to stand at $-78°$ C. for 17 hours prior to fluorine addition. A total of 1.2 moles of fluorine was added over a reaction period of sixty days at $-78°$ C. The volatile products contained 0.278 mole of $ClF_3O$ for a yield of 81 percent based upon $Cl_2O$ consumed. Pyrolysis of the solid yielded no volatile material.

EXAMPLE V

To 0.792 mole of $Cl_2O$ was added 1.4 moles of fluorine in three fractions over a reaction period of 30 days. Separation of the volatile products yielded 0.502 mole of $ClF_3O$ for a yield of 63 percent based upon $Cl_2O$ consumed.

Although the invention has been described and illustrated in detail, it is to be clearly understood that the same is by way of illustration and example only and is not to be taken by way of limitation, the spirit and scope of this invention being limited only by the terms of the appended claims.

We claim:
1. The compound $OClF_3$.
2. The compound $MF \cdot Cl_2O$, where M is an alkali metal.
3. The method of making $OClF_3$ comprising reacting $Cl_2O$ with fluorine and recovering said $OClF_3$.
4. The method of making $OClF_3$ comprising reacting $Cl_2O$ with an alkali metal fluoride at a temperature of from about $-116°$ C. to $+2°$ C. to form a complex therewith, fluorinating said complex, and recovering said $OClF_3$.

References Cited
UNITED STATES PATENTS 2,157,524   5/1939   Cady _____ 23—152

OTHER REFERENCES

Stacey et al.: Advances in Fluorine Chemistry, vol. 4, 1965, Butterworth, Inc., Washington, D.C., pp. 242, 243 and 249.

LELAND A. SEBASTIAN, Primary Examiner

U.S. Cl. X.R.

423—240, 466, 472